US010367701B2

(12) United States Patent
Nadaf et al.

(10) Patent No.: US 10,367,701 B2
(45) Date of Patent: Jul. 30, 2019

(54) FRAMEWORK FOR PROVISIONING NETWORK SERVICES IN CLOUD COMPUTING ENVIRONMENT

(71) Applicant: Tata Consultancy Services Limited, Mumbai (IN)

(72) Inventors: Shameemraj M Nadaf, Bengaluru (IN); Hemant Kumar Rath, Bengaluru (IN); Arun Kumar A V, Bengaluru (IN); Samar Shailendra, Bengaluru (IN); Anantha Simha, Bengaluru (IN)

(73) Assignee: Tata Consultancy Services Limited, Mumbai (IN)

( * ) Notice: Subject to any disclaimer, the term of this patent is extended or adjusted under 35 U.S.C. 154(b) by 180 days.

(21) Appl. No.: 15/253,115

(22) Filed: Aug. 31, 2016

(65) Prior Publication Data

US 2017/0063648 A1 Mar. 2, 2017

(30) Foreign Application Priority Data

Aug. 31, 2015 (IN) .......................... 3327/MUM/2015

(51) Int. Cl.
*H04L 12/24* (2006.01)
*H04L 29/08* (2006.01)
(Continued)

(52) U.S. Cl.
CPC ........ *H04L 41/5051* (2013.01); *G06F 9/5011* (2013.01); *G06F 9/5072* (2013.01);
(Continued)

(58) Field of Classification Search
CPC ............. H04L 12/4641; H04L 41/5051; H04L 45/586; H04L 49/10; G06F 15/16; G06F 2009/4557; G06F 9/45533
(Continued)

(56) References Cited

U.S. PATENT DOCUMENTS 8,601,483 B2 * 12/2013 He ..................... G06F 9/45558
718/104
9,065,734 B2 * 6/2015 Zhang ................. H04L 41/0806
(Continued)

FOREIGN PATENT DOCUMENTS

WO WO 2015/047451 A1 4/2015

OTHER PUBLICATIONS

Dixon, C. et al., "Software defined networking to support the software defined environmen", IBM Journal of Research and Development, IBM, vol. 58, No. 2/3, pp. 3:1-3:14, Mar./May 2014.
(Continued)

*Primary Examiner* — Tesfay Yohannes
(74) *Attorney, Agent, or Firm* — Finnegan, Henderson, Farabow, Garrett & Dunner LLP

(57) ABSTRACT

This disclosure relates generally to provisioning network services in a cloud computing environment, and more particularly to framework for provisioning network services in a heterogeneous cloud computing environment. In one embodiment, the disclosure includes a network as a service (NaaS) layer under a cloud provisioning platform. The NaaS layer can be interfaced with any cloud provisioning platform. The NaaS layer serves the networking needs of the heterogeneous cloud environment. It provides network services like monitoring, notifications, QoS policies, network topology and other services. For example, the cloud provisioning platform defines a virtual network and attaches a plurality of virtual machines to it. All the communications related to creation/deletion/update of virtual networks, virtual subnets, virtual ports, virtual router, virtual interfaces etc., are sent to the NaaS layer. On receiving the communication, the NaaS layer takes necessary steps to provide the network services as per the needs of the request. Apart from
(Continued)

provisioning, the NaaS layer periodically monitors the network elements as well.

11 Claims, 5 Drawing Sheets

(51) Int. Cl.
*H04L 12/64* (2006.01)
*G06F 9/50* (2006.01)

(52) U.S. Cl.
CPC ...... *H04L 12/6418* (2013.01); *H04L 41/5054* (2013.01); *H04L 67/10* (2013.01)

(58) Field of Classification Search
USPC .......................................... 709/220; 370/252
See application file for complete search history.

(56) References Cited

U.S. PATENT DOCUMENTS

| | | | |
|---|---|---|---|
| 9,088,570 B2* | 7/2015 | Anderson | H04L 67/10 |
| 9,344,751 B1* | 5/2016 | Ream | H04N 21/242 |
| 9,369,785 B1* | 6/2016 | Schmidtke | H04L 45/38 |
| 2012/0219931 A1* | 8/2012 | Pinnisi | G09B 19/0092 |
| | | | 434/127 |
| 2014/0082749 A1* | 3/2014 | Holland | G06F 21/645 |
| | | | 726/29 |
| 2014/0115126 A1* | 4/2014 | Nam | H04L 41/0873 |
| | | | 709/220 |
| 2014/0328190 A1* | 11/2014 | Lord | H04W 24/08 |
| | | | 370/252 |
| 2015/0063166 A1 | 3/2015 | Sif et al. | |
| 2015/0127795 A1* | 5/2015 | Jagana | H04L 41/5096 |
| | | | 709/223 |
| 2015/0163617 A1* | 6/2015 | Hall | H04W 4/20 |
| | | | 455/414.1 |
| 2015/0207586 A1* | 7/2015 | Xia | H04J 14/0269 |
| | | | 398/48 |
| 2015/0244589 A1* | 8/2015 | Bartfai-Walcott | |
| | | | H04L 47/2433 |
| | | | 709/226 |
| 2015/0295731 A1* | 10/2015 | Bagepalli | H04L 12/6418 |
| | | | 370/401 |
| 2015/0365929 A1* | 12/2015 | Gu | H04W 8/20 |
| | | | 455/450 |
| 2016/0077807 A1* | 3/2016 | Newman | G06F 9/5072 |
| | | | 717/104 |
| 2016/0092277 A1* | 3/2016 | Crowell | G06F 9/45558 |
| | | | 718/1 |
| 2016/0330497 A1* | 11/2016 | VanAntwerp | H04N 21/2665 |
| 2017/0019313 A1* | 1/2017 | Doshi | G06N 3/12 |
| 2017/0063648 A1* | 3/2017 | Nadaf | H04L 41/5051 |
| 2017/0142676 A1* | 5/2017 | Iovanna | H04W 56/0015 |
| 2017/0294134 A1* | 10/2017 | Angel | G09B 5/065 |

OTHER PUBLICATIONS

Kreutz, D. et al., "Software-Defined Networking: A Comprehensive Survey", Proceedings of the IEEE, IEEE, vol. 103: 1, pp. 14-76, Jan. 2015.

* cited by examiner

FRAMEWORK FOR PROVISIONING NETWORK SERVICES IN CLOUD COMPUTING ENVIRONMENT

PRIORITY CLAIM

This U.S. patent application claims priority under 35 U.S.C. § 119 to: India Provisional Application No. 3327/MUM/2015, filed on Aug. 31, 2015. The entire contents of the aforementioned application are incorporated herein by reference

TECHNICAL FIELD

This disclosure relates generally to provisioning network services in a cloud computing environment, and more particularly, to framework for provisioning network services in a heterogeneous cloud computing environment.

BACKGROUND

Cloud computing is an Internet-based computing that provides shared processing of resources and data to computers and other devices based on demand. The cloud computing provides access to the resources like networks, servers, storage, applications and services. These resources can be rapidly provisioned and released with minimal management effort in the cloud computing. The cloud infrastructure that can be utilized in a pay-by-use method by public is called as a Public cloud. The cloud infrastructure that is utilized by a single organization internally and which is not available for public is called as a Private cloud.

The inventors here have recognized several technical problems with such conventional systems, as explained below. The services provided in cloud computing includes Software as a Service (SaaS), Platform as a Service (PaaS) and Infrastructure as a Service (IaaS). The IaaS, offers Compute as a Service for deployment of Virtual Machines (VMs), Storage as a Service for providing storage space to the VMs and Network as a Service for providing connectivity with services such as layer 2 switching, layer 3 routing, load balancing, firewall etc., to the VMs by using pool of infrastructure resources (CPU cores, memory, hard disk space, network switch, router, etc.) available in the cloud. The Network as a Service makes use of the underlying physical networks for provisioning services to the VMs. Examples of the physical networks include a Software Defined Network (SDN) type, a non-SDN type (also called as a legacy network) or a hybrid of both (heterogeneous network). Moreover, in cloud computing, resources are hosted at public and private clouds and a simple one touch provisioning becomes a key requirement for the customers. Such network provisioning requires appropriate interfaces and information exchange with the public and private cloud resources. The optimal utilization of the resources that are geographically distributed across different locations (private cloud resources) and the public cloud resources accessible via the Internet is a challenging task.

SUMMARY

Embodiments of the present disclosure present technological improvements as solutions to one or more of the above-mentioned technical problems recognized by the inventors in conventional systems. For example, in one embodiment, a method for provisioning network services in a heterogeneous cloud computing environment is provided. The method includes assigning compute and storage resources to one or more virtual machine provisioning requests and generating one or more network service requests for at least one of creation, update or deletion of at least one of virtual networks, subnets, ports, routers and interfaces by the cloud provisioning platform. Further, one or more network service requests are sent to a middle layer called network as a service (NaaS) layer by the cloud provisioning platform for provisioning network services, wherein the NaaS layer comprises a plurality of interfaces including a north bound interface module, a south bound interface module, a network orchestration and intelligence module and an east west interface module for provisioning network services in a cloud system. Subsequently, underlying physical networks are configured for each of the network service requests.

In another embodiment, a system for provisioning network services in a heterogeneous cloud computing environment is disclosed. The system includes at least one processor, and a memory communicatively coupled to the at least one processor, wherein a memory includes a network as a service (NaaS) layer module for provisioning network services in a heterogeneous cloud computing environment. The system includes assigning compute and storage resources to one or more virtual machine provisioning requests and generating one or more network service requests for at least one of creation, update or deletion of at least one of virtual networks, subnets, ports, routers and interfaces by the cloud provisioning platform. Further, one or more network service requests are sent to a middle layer called Network as a Service (NaaS) layer by the cloud provisioning platform for provisioning network services, wherein the NaaS layer comprises a plurality of interfaces including a north bound interface module, a south bound interface module, a network orchestration and intelligence engine and an east west interface module for provisioning network services in a cloud system. Subsequently, underlying physical networks are configured for each of the network service requests sending one or more network service requests to the NaaS layer by the cloud provisioning platform wherein the NaaS layer comprises a plurality of interfaces including a north bound interface module, a south bound interface module and an east west interface module for provisioning network services in a cloud system and appropriately configuring the underlying physical network for each of the network service requests.

In yet another embodiment, a non-transitory computer readable medium embodying a program executable in a computing device for provisioning network services in a heterogeneous cloud computing environment is disclosed. The program comprises a program code for a network as a service (NaaS) layer module for provisioning network services in a heterogeneous cloud computing environment. The program code includes assigning compute and storage resources to one or more virtual machine provisioning requests and generating one or more network service requests for at least one of creation, update or deletion of at least one of virtual networks, subnets, ports, routers and interfaces by the cloud provisioning platform. Further, one or more network service requests are sent to a middle layer called network as a service (NaaS) layer by the cloud provisioning platform for provisioning network services, wherein the NaaS layer comprises a plurality of interfaces including a north bound interface module, a south bound interface module, a network orchestration and intelligence module and an east west interface module for provisioning network services in a cloud system. Subsequently, underlying physical networks are configured for each of the network service requests.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

System and method for provisioning network services in a heterogeneous cloud computing environment is disclosed. The system can be implemented in a variety of computing devices. The computing devices that can implement the described system include, but are not limited to, desktop computers, laptops or other portable computers, multiprocessor systems, microprocessor based programmable consumer electronics, laptops, network computers, minicomputers, mainframe computers, and the like. Although the description herein is with reference to certain computing systems, the system may be implemented in other devices, albeit with a few variations, as will be understood by a person skilled in the art.

In the present disclosure, system and method for provisioning network orchestration and network services in the heterogeneous cloud computing environment is disclosed. The framework includes a middle layer that can be interfaced with any cloud provisioning platform. The proposed framework includes a network as a service (hereinafter called as NaaS) layer as a middle layer with modules for a northbound, a core module, an east-west and a south bound interfacing.

The manner in which the described system is implemented to enable concurrent principal component analysis computation has been explained in detail with respect to the following figure(s). While aspects of the described system can be implemented in any number of different computing systems, transmission environments, and/or configurations, the embodiments are described in the context of the following exemplary system.

Figure 1:
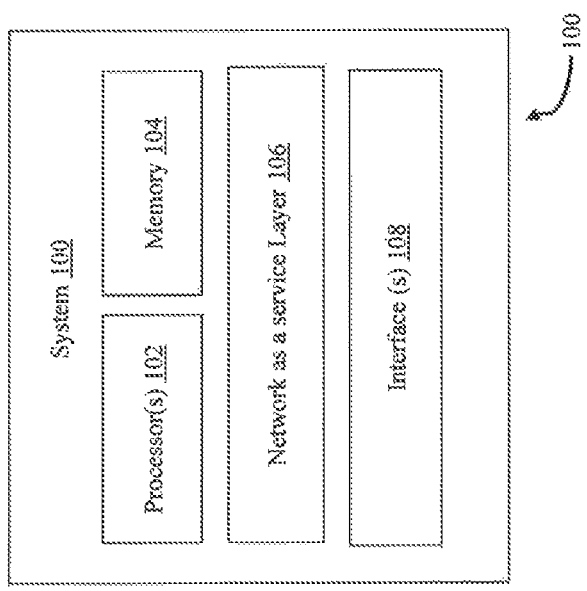
FIG. 1 illustrates an exemplary system for provisioning network services in a heterogeneous cloud computing environment, according to some embodiments of the present disclosure.

FIG. 1 schematically illustrates a system 100 for provisioning network services in a heterogeneous cloud computing environment, according to an embodiment of the present disclosure. As shown in FIG. 1, the system 100 includes one or more processor(s) 102 and a memory 104 communicatively coupled to each other. The memory 104 includes a network as a service (NaaS) layer module 106 that provisions network services requested by a multiple clients in a heterogeneous environment. The system 100 also includes interface(s) 108. Although FIG. 1 shows example components of the system 100, in other implementations, the system 100 may contain fewer components, additional components, different components, or differently arranged components than depicted in FIG. 1.

The processor(s) 102 and the memory 104 may be communicatively coupled by a system bus. The processor(s) 102 may include circuitry implementing, among others, audio and logic functions associated with the communication. The processor 102 may include, among other things, a clock, an arithmetic logic unit (ALU) and logic gates configured to support operation of the processor(s) 102. The processor(s) 102 can be a single processing unit or a number of units, all of which include multiple computing units. The processor(s) 102 may be implemented as one or more microprocessors, microcomputers, microcontrollers, digital signal processors, central processing units, state machines, logic circuitries, and/or any devices that manipulate signals based on operational instructions. Among other capabilities, the processor(s) 102 is configured to fetch and execute computer-readable instructions and data stored in the memory 104.

The functions of the various elements shown in the figure, including any functional blocks labeled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional, and/or custom, may also be included.

The interface(s) 108 may include a variety of software and hardware interfaces, for example, interfaces for peripheral device(s), such as a keyboard, a mouse, an external memory, and a printer. The interface(s) 108 can facilitate multiple communications within a wide variety of networks and protocol types, including wired networks, for example, local area network (LAN), cable, etc., and wireless networks, such as Wireless LAN (WLAN), cellular, or satellite.

For the purpose, the interface(s) 108 may include one or more ports for connecting the system 100 to other network devices.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 104, may store any number of pieces of information, and data, used by the system 100 to evaluate the qualitative and quantitative performance rating. The memory 104 may be configured to store information, data, applications, instructions or the like for system 100 to carry out various functions in accordance with various example embodiments. Additionally or alternatively, the memory 104 may be configured to store instructions which when executed by the processor 102 causes the system 100 to behave in a manner as described in various embodiments. The memory 104 includes the NaaS layer 106 and other modules. The module 106 include routines, programs, objects, components, data structures, etc., which perform particular tasks or implement particular abstract data types.

In the present disclosure, an open source platform called OpenNaaS (Open Platform for network as a service) is used for developing the prototype for the network as a service layer (i.e., NaaS layer 106). Also in the proposed framework, only the basic java services are used and is not dependent on any of the components present in OpenNaaS. Therefore, the NaaS layer 106 can be easily interfaced with any cloud provisioning system by means of suitable interfaces. In an example, the proposed disclosure used an Open Stack interface. For example, the network as a service layer supports modularization in java with extensive library support. It is easy to develop and deploy applications or services on the NaaS layer 106. In addition, a Software Defined Network (SDN) control plane management is also incorporated in this layer along with modules in controllers like a Floodlight and an OpenDayLight SDN controllers.

Figure 2:
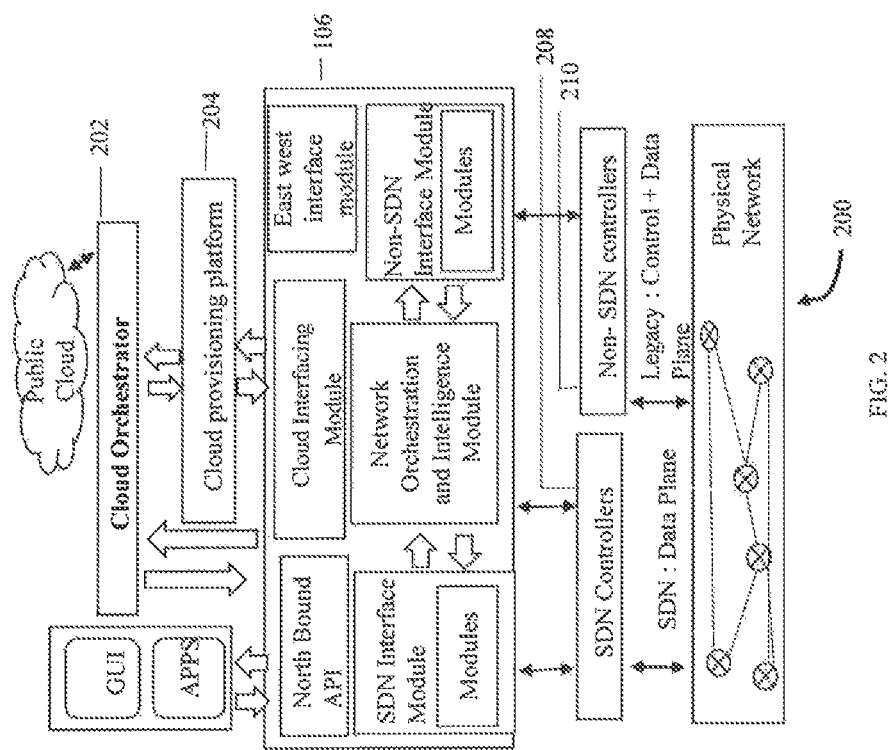
FIG. 2 illustrates a framework for provisioning network services in a cloud computing environment in accordance with some embodiments of the present disclosure.

FIG. 2 depicts a framework 200 for provisioning network services in a heterogeneous cloud computing environment. The framework 200 of a cloud system includes a plurality of tenants (consumers of the resources), a cloud orchestrator 202, a cloud provisioning platform (For e.g., Open Stack) 204 and a cloud administrator. The cloud orchestrator 202 acts as an interface with different public and private clouds to provide cloud provisioning services. The cloud provisioning platform 204 includes a cloud controller, a management and a plurality of service entities along with a pool of resources. The management entities reside in the cloud controller and the service entities are directly a part of the resources or a middle layer (network as a service layer 206) controlling the underlying resources.

The cloud orchestrator 202 distributes the virtual machine provisioning requests received by tenants or a cloud administrator to cloud provisioning platform 204. The cloud provisioning platform 204 interface defines a virtual network and requests attachment of virtual machines to one or more virtual network through virtual machine provisioning requests. All the communication related to creation or deletion or update of a virtual network, a virtual subnet, a virtual port etc., are sent to the NaaS layer 106 through corresponding HTTP methods (POST, PUT, GET and DELETE). On receiving the communication, the NaaS layer 106 takes necessary steps to provide the network services. The virtual networks provisioned can be an overlay or an underlay network and these are associated with the underlying physical network through appropriate configurations.

The overlay network is a tunneling kind of network created between two endpoints and operates on top of the underlying physical network. The overlay network assumes the physical network as an always available resource. Generic Routing Encapsulation (GRE) and Virtual eXtensible Local Area Network (VXLAN) tunnels are few examples of the overlay network. In an example embodiment, the NaaS layer 106 provisions tunnels between appropriate end points to enable communication between the virtual machines.

The underlay network is a physical network which needs configuration of the actual network elements such as switches, routers, firewalls, etc. VLAN is an example of an underlay network. The network elements in the underlay network can be either SDN enabled or pure legacy in nature. The proposed framework configures the network elements appropriately to enable communication. The legacy control/Network Management Systems (NMS) are employed for performing configurations on the non-SDN network elements. Whereas, in case of SDN, the proposed framework configures appropriate rules inside the corresponding network elements through the SDN controllers 208. Similarly, this proposed framework configures the network resources to provide routing, firewall, load balancing, Dynamic Host Configuration Protocol (DHCP) and other services. This can deploy SDN controllers 208 and provide NFV services through a set of dedicated resources. This is also responsible to provide access to the Internet and other geographically distributed resources through the dedicated external networks.

Figure 3:
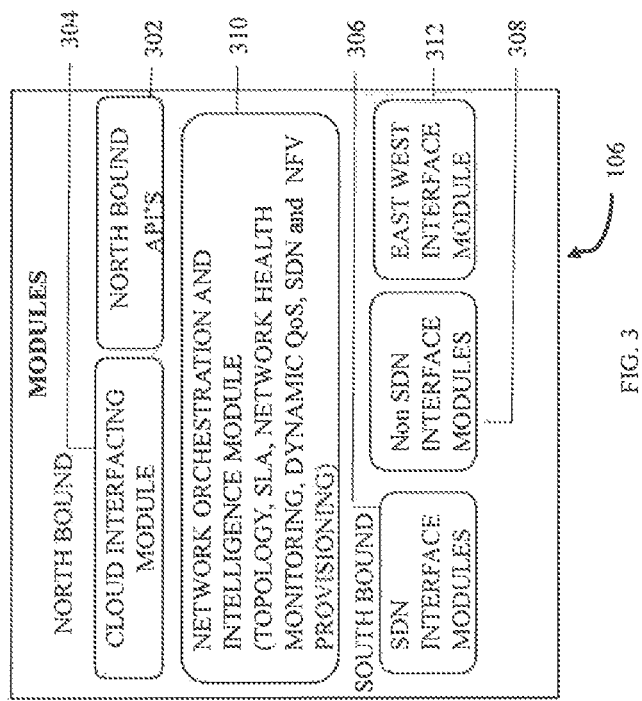
FIG. 3 illustrates a network as a service layer that provisions networking needs of a heterogeneous cloud computing environment in accordance with some embodiments of the present disclosure.

The NaaS layer 106 that is described in detail in FIG. 3 is underneath the cloud provisioning system (i.e., a private cloud) and one instance is required for each deployment of the private cloud. The network services are provided to a GUI (Graphical User Interface) and other user applications by the NaaS layer 106. The proposed NaaS layer 106 uses separate east west bound interfaces to manage the resources in the public cloud and communicate with different instances of NaaS 106 deployed in different private clouds. A distributed approach is followed for network orchestration and services provisioning in coordination with the top level cloud orchestrator entity. The data exchange mechanism is designed and implemented for the NaaS layer 106.

FIG. 3 illustrates a network as a service layer 106 that provisions networking needs of a heterogeneous cloud computing environment, according to an embodiment of the present subject matter. More particularly, FIG. 3 depicts the detailed components of the NaaS layer 106. On the north bound side, the NaaS layer has North Bound API's (Application Programming Interface) 302 and cloud interfacing module 304. The North Bound API'S 302 provide different services to the requests received from a Graphical User Interface (GUI) and other user applications. The cloud interfacing module 304 interfaces with different clouds to provide network service requests that are received by the NaaS layer 106. While on the south bound side, it has the SDN interface modules 306 and non-SDN (legacy) interface modules 308 that communicate with the corresponding network control/management systems. The SDN interface module communicates with the SDN controllers 208 (Floodlight, OpenDayLight, etc.) and Non-SDN controllers 210 (as shown in FIG. 2). Also, an optimization engine and information exchange modules are developed in SDN controllers 208 to support dynamic scalability in SDN. The NaaS layer 106, also comprises of east west interface module 312 for exchanging data among different instances of network as a service layer 106 deployed for different private clouds. Moreover, the east west interface module 312 may be used to provide communication with other network as a service platforms or public cloud entities.

In between the north bound and south bound interfaces, the NaaS layer 106 includes a core engine called as a network intelligence and orchestration module 310. The network intelligence and orchestration module 310 includes a topology module, a network elements monitoring module, a policy management module, a dynamic QoS provisioning module etc.

Apart from provisioning, the NaaS layer 106 also periodically monitors the networks. For example, a topology module shown in the NaaS layer 106 keeps track of the switches, inter-switch links, and switch to host connections. This solution makes use of the SDN interface module 306 and the non-SDN interface module 308 for collecting the topology related information. The NaaS layer 106 also maps a local to global topology with respect to the distribution of cloud resources. Further, the NaaS layer 106 collects required network statistics for network health monitoring and dynamic QoS provisioning. The NaaS layer 106 can allow or deny network provisioning requests or divert them to different resource pools as per the network health.

Further, the NaaS layer 106 supports easy deployment of a multiple REST APIs for providing different services to application developers. For instance, the GUI of the NaaS layer 106 makes use of the REST APIs exposed to provide several control and policy features to the users. The quality of service (QoS) policy package including features such as rate limiting, egress traffic shaping, egress traffic scheduling, dynamic QoS assignment, quota based limits, dynamic SDN control plane management etc., are supported by the above mentioned APIs. The cloud administrators can utilize these features to suit the business requirements and also to prioritize the services to different tenants.

In an example embodiment, evaluation of the cloud network services provisioning using the NaaS layer 106 in Open Stack Icehouse cloud provisioning setup is disclosed. A lab environment consisting of workstations for deploying the Open Stack 3-node architecture that comprises of a controller node, network node and compute nodes is disclosed.

Figure 4:
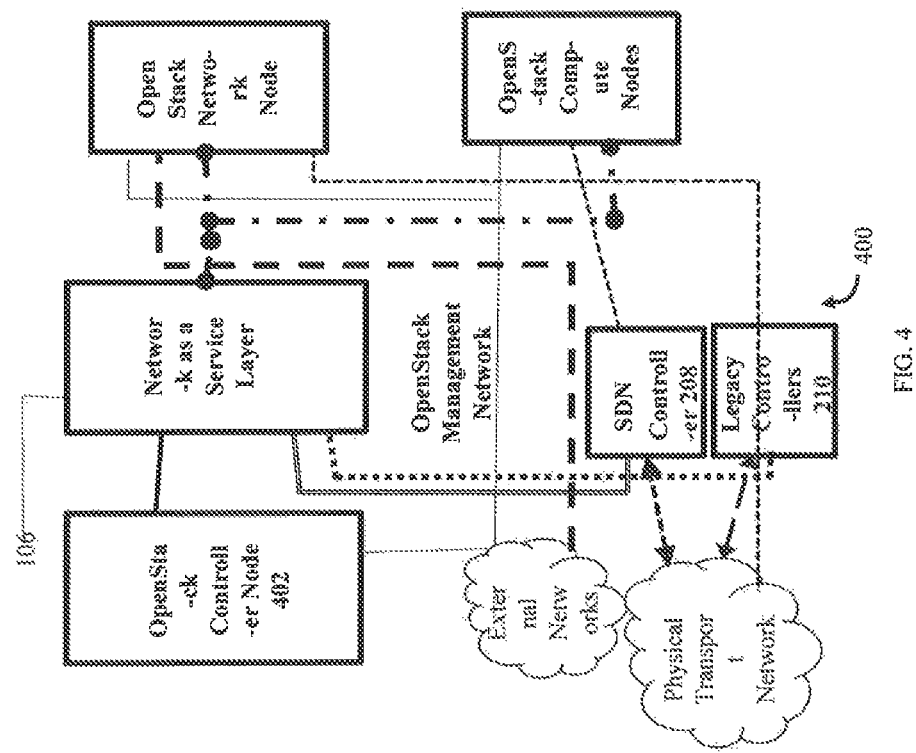
FIG. 4 illustrates the evaluation process involved in the networking provisioning with respect to the Open Stack Icehouse cloud software in accordance with some embodiments of the present disclosure.

FIG. 4 is an example of the evaluation process involved in the network provisioning system with respect to the Open Stack Icehouse cloud software. The Controller Node 402, the SDN controller 208 and the Non-SDN controller 210 are connected to the NaaS layer 106 to provide network services to Open Stack Cloud.

Figure 5:
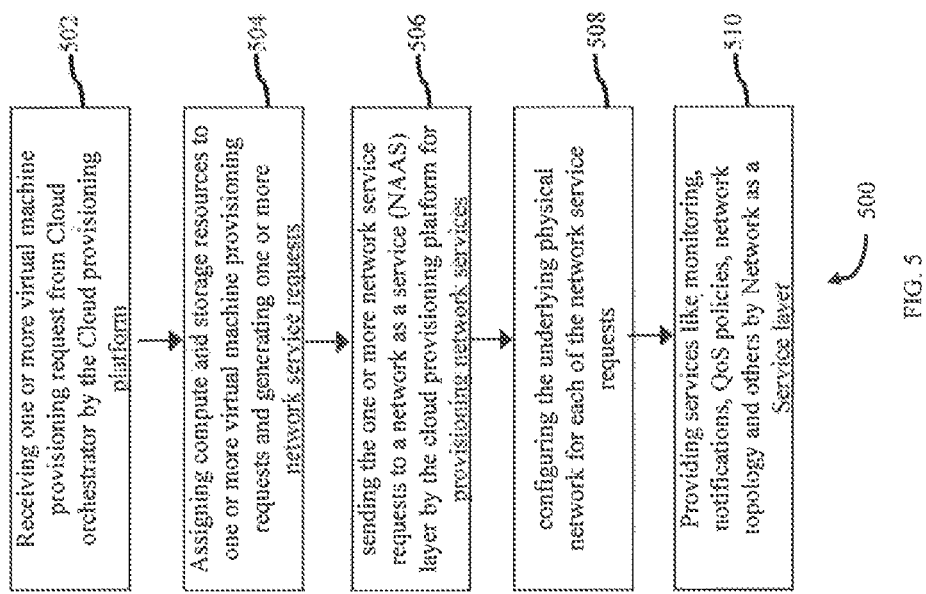
FIG. 5 is a flow chart depicting a method for provisioning network services in a heterogeneous cloud environment accordance with some embodiments of the present disclosure.

FIG. 5 illustrates a flow chart depicting a method for provisioning network services in a heterogeneous cloud environment. At block 502, one or more virtual machine provisioning requests are received from the cloud orchestrator 202 and flow down to the cloud provisioning platform 204. Further at block 504, the required compute and storage resources are assigned by the cloud provisioning platform to the virtual machine provisioning requests and further the one or more network service requests are generated. At block 506, the one or more network service requests are sent to the NaaS layer 106 by the cloud provisioning platform 204 for providing network services. Appropriate configuration of the physical network elements to enable communication between the virtual machines is performed by the NaaS layer 106 via the corresponding SDN controllers 208 or Non-SDN controllers 210 (as mentioned in FIG. 2) at block 508. Furthermore at block 510, network services such as network health monitoring, virtual machine network information subscriptions, notifications for registered subscriptions, network topology, dynamic QoS provisioning, load balancing provisioning, firewall provisioning, dynamic SDN scalability, NFV based provisioning with service chaining etc., are provided by NaaS layer 106 for the virtual machines and virtual networks provisioned in the cloud provisioning platform 204 via cloud orchestrator 202 (as mentioned in FIG. 2).

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier ayes and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for provisioning network services in a heterogeneous cloud computing environment, comprising:
   receiving, by a cloud provisioning platform, one or more virtual machine provisioning requests from a plurality of cloud administrators, wherein one or more virtual machine provisioning requests are distributed to said cloud provisioning platform via a cloud orchestrator;
   assigning of compute and storage resources to one or more virtual machine provisioning requests and generating one or more network service requests for at least one of creation, update, and deletion of at least one of virtual networks, subnets, ports, routers and interfaces by the cloud provisioning platform;

sending the one or more network service requests to a Network as a Service (NaaS) layer by the cloud provisioning platform for provisioning the network services; and provisioning, by the NaaS layer, a virtual network by configuring an underlying physical network(s), to provide the network services for each of the one or more network service requests, wherein the provisioned virtual network is one of an overlay network or configured underlying physical network, wherein the overlay network is a tunnel network operating on top of the underlying physical network, wherein the underlying physical network is provisioned by configuring underlying physical network elements; wherein the NaaS layer comprises a plurality of interfaces including a north bound interface module, a south bound interface module and an east west interface module for provisioning network services in a cloud system; and wherein the NaaS layer facilitates analysis and data exchange between instances of NaaS layer deployed in one or more clouds and one or more public cloud interfaces in the east west interface module.

2. The method of claim 1, wherein the south bound interface module includes a software defined network (SDN) and a non-SDN interface module on the south bound to communicate with corresponding network control or a management system.

3. The method of claim 2, wherein the south bound interface module interfaces with the SDN and non-SDN network control and management hardware and software.

4. The method of claim 1, wherein the north bound interface module interfaces with the cloud system to provide network services for graphical user interface (GUI) and one or more user applications.

5. The method of claim 1, the NaaS layer further comprises a network orchestration and intelligence module between the north bound interface module and the south bound interface module, wherein the network orchestration and intelligence module tracks a plurality of switches, inter-switch links and monitors elements of the underlying physical network.

6. A system for provisioning network services in a heterogeneous cloud computing environment, the system comprising:
   at least one processor;
   a memory communicatively coupled to the at least one processor, wherein the memory includes a Network as a Service (NaaS) layer to:
   receive, by a cloud provisioning platform, one or more virtual machine provisioning requests from a plurality of cloud administrators, wherein one or more virtual machine provisioning requests are distributed to said cloud provisioning platform via a cloud orchestrator,
   assign of compute and storage resources to one or more virtual machine provisioning requests and generate one or more network service requests for at least one of creation, update, or deletion of at least one of virtual networks, subsets, ports, routers and interfaces by the cloud provisioning platform,
   send the one or more network service requests to the NaaS layer by the cloud provisioning platform for provisioning the network services; and
   provisioning, by the NaaS layer, a virtual network by configuring an underlying physical network(s), to provide the network services for each of the one or more network service requests, wherein the provisioned virtual network is one of an overlay network or configured underlying physical network, wherein the overlay network is a tunnel network operating on top of the underlying physical network, wherein the underlying physical network is provisioned by configuring underlying physical network elements; wherein the NaaS layer comprises a plurality of interlaces including a north bound interface module, a south bound interface module and an east west interface module for provisioning network services in a cloud system; and wherein the NaaS layer facilitates analysis and information exchange between instances of network as a service layer deployed in one or more clouds and public cloud interfaces in the east west interface module.

7. The system as claimed in claim 6, wherein the south bound interface module includes a software defined network (SDN) and a non-SDN interface module on the south bound side of the NaaS layer (106) to communicate with corresponding network control or a management system.

8. The system as claimed in claim 7, wherein the south bound interface module interfaces with the SDN and non-SDN network control and management hardware and software.

9. The system as claimed in claim 6, wherein the north bound interface module interfaces with the cloud system to provide network services for graphical user interface (GUI) and one or more user applications.

10. The system as claimed in claim 6, the NaaS layer further comprises a network orchestration and intelligence module between the north bound interface module and the south bound interface module, wherein the network orchestration and intelligence module tracks a plurality of switches, inter-switch links and monitors elements of the physical network.

11. A non-transitory computer readable medium embodying a program executable in a computing device for provisioning network services in a heterogeneous cloud computing environment, the program comprising:
   a program code for receiving, by a cloud provisioning platform, one or more virtual machine provisioning requests from a plurality of cloud administrators, wherein one or more virtual machine provisioning requests are distributed to said cloud provisioning platform via a cloud orchestrator;
   assigning of compute and storage resources to one or more virtual machine provisioning requests and generating one or more network service requests for at least one of creation, update, and deletion of at least one of virtual networks, subnets, ports, routers and interfaces by the cloud provisioning platform;
   sending the one or more network service requests to a Network as a Service (NaaS) layer by the cloud provisioning platform for provisioning the network services; and
   provisioning, by the NaaS layer, a virtual network by configuring an underlying physical network(s), to provide the network services for each of the one or more network service requests, wherein the provisioned virtual network is one of an overlay network or configured underlying physical network, wherein the overlay network is a tunnel network operating on top of the underlying physical network, wherein the underlying physical network is provisioned by configuring underlying physical network elements; wherein the NaaS layer comprises a plurality of interlaces including a north bound interface module, a south bound interface module and an east west interface module for provisioning network services in a cloud system; and wherein the NaaS layer facilitates analysis and information exchange between instances of network as a service layer deployed in one or more clouds and public cloud interfaces in the east west interface module.

* * * * *